Patented Apr. 20, 1926.

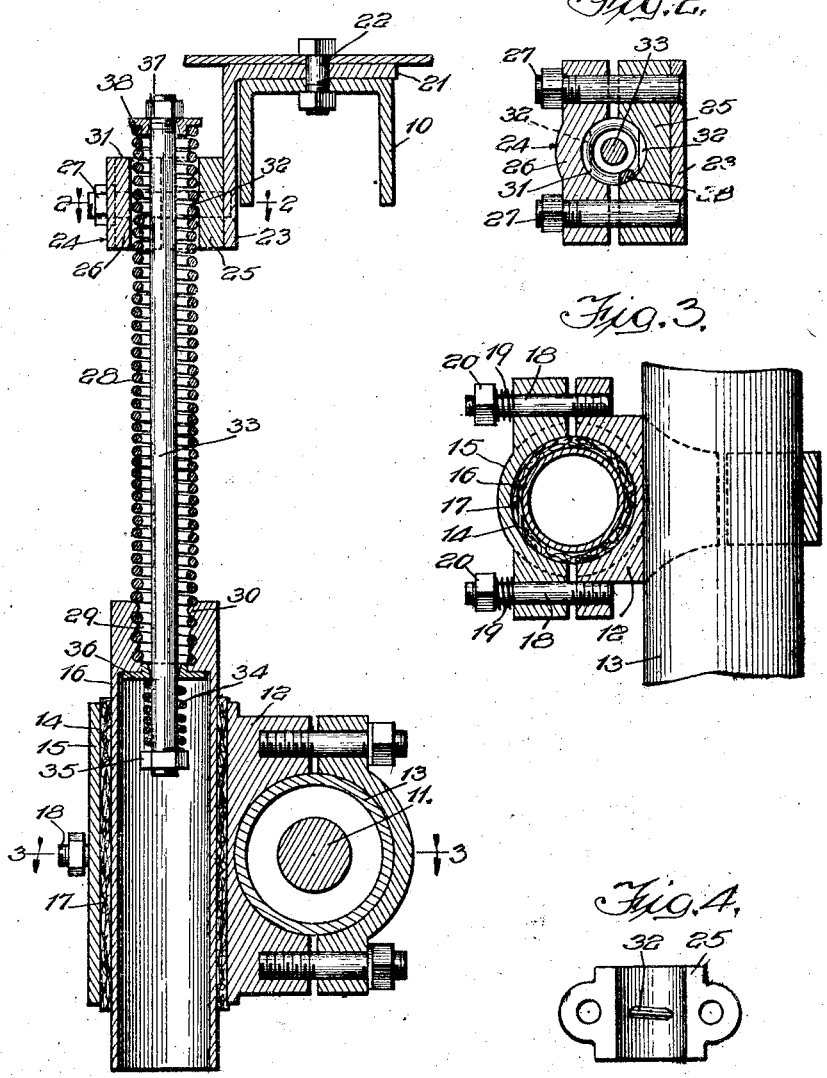

1,581,490

UNITED STATES PATENT OFFICE.

EDDY T. McKAIG, OF CHICAGO, ILLINOIS.

SHOCK ABSORBER.

Application filed June 21, 1924. Serial No. 721,510.

*To all whom it may concern:*

Be it known that I, EDDY T. McKAIG, a citizen of the United States, and resident of Chicago, in the county of Cook and State of Illinois, have invented certain new and useful Improvements in a Shock Absorber, of which the following is a specification.

My invention relates to improvements in shock absorbers and has special reference to the provision of devices of simple and efficient construction for preventing the transmission of shocks or sudden relative movements between the axles and body of an automobile.

The object of my invention is to provide a shock absorber for the purpose mentioned which can be easily attached without difficulty, which will permit the necessary relative sidewise, tipping and swaying movements of the axles and body without binding or undue distortion, and which shall be free of any joints or connections which might wear and cause noise or knocks in operation, or require adjustment or other attention to prevent or eliminate such noise or knocks.

An important feature of my invention relates to the provision of an element frictionally held against movement relatively to one of the members and connected to the other member by means of a connector which is sufficiently flexible or yieldable laterally to permit of the necessary relative lateral movement of the two members, and yet which directly connects the two members without any wearing joints.

My invention will be more readily understood by reference to the accompanying drawings forming part of this specification and in which:—

Figure 1, is a fragmentary, vertical, sectional view showing one, the preferred, form of my novel shock absorber and its manner of attachment to a vehicle;

Figure 2, is a horizontal section on the line 2—2 of Figure 1;

Figure 3, is a horizontal section on the line 3—3 of Figure 1; and

Figure 4, is an inner view of the upper securing bracket.

In said drawings, 10 illustrates a cross bar or member of a vehicle body frame, and 11 illustrates the rear axle of the vehicle. As is usual the body frame and the axle are connected by springs which it is not thought necessary to illustrate. I provide between the body frame and the axle a simple shock absorber which effectually prevents any overthrow of the main spring supports, either up or down, and which also effectively prevents any excessive or undesired rebound action of the main springs.

This device comprises a bearing-like member 12 clamped rigidly to the axle housing 13 and provided with a straight vertically arranged cylindrical opening 14. The housing which forms the opening 14 is made like a bearing having a cap 15.

I provide a straight cylindrical plunger member 16 which is movable vertically within the opening 14 and is frictionally held therein by being clamped in a fibrous lining 17. The lining is clamped upon the cylinder 16 by the holding bolts 18 and rather stiff springs 19 beneath the nuts 20.

For connecting the upper end of the absorber to the cross member 10, I provide a bracket member 21 having a horizontal end 22 which is adapted to be placed upon the top of the member 10, and to be secured in place by a body bolt 22. The opposite end 23 of the member 21 is bent down, and to this end I secure a spring clamping bearing-like member 24 comprising a base 25, secured rigidly to the end 23 and a cap member 26 removably secured to the base by the bolts 27. I connect the member 24 and the cylinder 16 by an elongated spring 28 which is preferably wound parallel and slightly open. To connect the lower end of the spring to the cylinder 16, I provide the upper end of the cylinder with an opening 29 which is provided with an internal thread 30, adapting the opening to receive the end of the spring. The spring is screwed into the opening and the thread 30 is so made that in screwing the spring into place the coils of the spring are spread apart longitudinally of the spring, thus causing the spring to be tightly bound in the opening 29.

The member 24 is provided with a smooth vertical opening 31 which substantially fits the external diameter of the spring, and I provide narrow projections 32 within the opening 31, adapted to enter between adjacent coils of the spring to positively hold the spring against movement through the opening 31. It is obvious that by loosening the cap 26 the spring can readily be adjusted relatively to the member 24 to lengthen or shorten the active portion of the spring between the member 24 and the cylindrical plug 16. The total opening of the spring 28 only permits the spring to close about one-half an inch before the spring is completely closed. This amount of opening permits the body and axle to approach each other to this extent before applying sufficient force to move the cylinder 16 against the friction which tends to hold it, but after this much relative movement toward each other, the spring acts as a rigid strut to force the cylinder down through the member 12.

On the opposite or separating movement of the two members the spring extends to a certain extent and then is so stiff or strong that it acts as a tension member to pull the cylinder up through the member 12.

I may and usually prefer to positively limit the extension of the spring 28. For this means I provide an elongated bolt 33 extending centrally through the spring 28 from end to end. The lower end of this bolt carries a short compression spring 34 arranged between a nut 35 on the lower end of the bolt and a centering washer 36 bearing against the lower end of the threaded upper end of the cylinder. The rod 33 passes freely up through the spring 28 and is held in place by a nut 37 on its upper end bearing against a centering washer 38, arranged on the upper end of the spring 28. The spring 34 at the lower end of the bolt 33 is relatively light and is wound open enough to allow about one-half inch free separations of the two connected members 10 and 11 before the rod 33 acts as a positive tie between the two members.

The bolt or rod 33 passes freely through both the washers 36 and 38, so that the necessary swing or swaying movements of the members 10 and 11 are not hindered and the connection between the two, comprising the spring 28 and the rod 33, acts as a practical universal connection between these two members.

I have found that the spring 28 can be wound to serve both as the pusher and puller without any preliminary expansion or contraction, but such arrangement is not quite so satisfactory as the arrangement illustrated, inasmuch as the slight ordinary vibrations produced by an ordinary smooth road keeps the cylinder 16 on a constant movement up and down, and hence wears somewhat faster than the arrangement shown, which allows such slight vibrations without any movement of the cylinder.

It is to be noted that between the two members 10 and 11 there is not a single joint which acts both up and down, or, in other words, resists both expansion and contraction which is subject to wear and hence to adjustment. In fact there is not a single joint which can produce a knock or a rattle, either when the device is first applied or after it has been used for any length of time.

The connection is continuous between the two members 10 and 11 and yet it is sufficiently flexible to allow for any practical relative sidewise or relatively angular movements of these two members. The only element which may wear in use is the lining 17 or possibly the cylinder 16, but this wear is automatically taken up by the springs 19.

The device is exceedingly simple, can be manufactured at a relatively small cost, can be readily and easily applied and is practically indestructible in use.

As many modifications of my invention will readily suggest themselves to one skilled in the art, I do not limit or confine my invention to the specific details of construction herein illustrated and described.

I claim:

1. In a shock absorber for vehicles, adapted to connect two members of the vehicle which are also connected by a load carrying spring, said absorber having a longitudinally movable part at one end, means carried by one of the vehicle members for frictionally resisting said longitudinal movement, and a laterally yielding part rigidly connected at one end to said longitudinally movable part and at the other end to the other of said vehicle members.

2. In a shock absorber for interposition between two spring connected and relatively movable members, a part having a frictionally retarded connecting arrangement with one of said members, and connected positively to the other member, said part connecting the frictionally retarded part with the opposite end being yieldable laterally to leave the two members free for necessary relative swaying movements.

3. In a shock absorber for connecting two spring connected members of a vehicle, said shock absorber having a part frictionally held against movement on one of said vehicle members and a part rigidly mounted on the other vehicle member and a laterally yieldable part rigidly held at one end by said rigid part and rigidly connected at its other end to said frictionally held part.

4. In a shock absorber, parts adapted to be rigidly attached to two relatively movable load carrying spring connected members, a third part interposed between said two parts, comprising a close wound compression spring rigidly attached at one end to a straight cylindrical member, one of said rigidly mounted parts adapted to rigidly clamp the free end portion of the spring and the other of said rigidly mounted parts provided with a bore for receiving said cylindrical member, and means for frictionally holding the cylindrical member against free movement in said bore.

5. In a device of the kind described, a relatively close wound spring adapted to be used to both push and pull, a member having an adjustable bore for clamping one end of the spring, said member having an internal projection adapted to enter between adjacent turns of the spring to hold the spring against endwise movement in the bore.

6. In a device of the kind described, having a main extensible spiral spring for connecting two relatively movable parts, said spring being substantially close wound to limit its compressibility, a rod extending through said main spring, and an opposing and weaker spring on the rod arranged between a shoulder on the rod and one of the parts by which said main spring is held, said weaker spring being also close wound to limit its shortening, the opposite end of the rod having a shoulder held tightly in contact with the opposite end of the main spring, as and for the purpose specified.

7. In a device of the kind described, a main laterally yielding spiral spring for connecting two relatively movable parts, a rod extending through the spring for limiting the extension thereof and said spring being substantially closely wound to limit the compression thereof, an auxiliary spring arranged between a shoulder on one end of the rod and one of the parts connected to the main spring, the opposite end of the rod having a shoulder held tightly in contact with the opposite end of the main spring, the auxiliary spring being under sufficient initial compression to permit the limited shortening of the main spring without freeing the rod of tension and said auxiliary spring being substantially close wound to limit the extension of the main spring.

8. In a shock absorber of the kind described, a flexible connector connected rigidly at one end to a member of a vehicle chassis, and at the other end to a movable part adapted to be frictionally retained against free movement in cooperation with an opposed part of the vehicle chassis, a tension rod extending through said flexible connector and arranged to limit the extension thereof, and tensioning means on said rod adapted to maintain said rod in tension.

9. In a device of the kind described, a cylindrically wound spring adapted to be rigidly attached at one end to one member of a vehicle, a frictionally held cylinder mounted on an opposing member of the vehicle, to which the opposite end of the spring is rigidly secured, whereby the spring serves both as a tension and strut member to operate the cylindrical member and permits swaying movement of the two vehicle members.

In testimony whereof, I have hereunto set my hand, this 18th day of June, 1924.

EDDY T. McKAIG.